United States Patent [19]

Shepherd et al.

[11] Patent Number: 5,443,783

[45] Date of Patent: Aug. 22, 1995

[54] PROCESS FOR BLOW MOLDING ARTICLES FROM LIQUID CRYSTAL POLYMERS

[75] Inventors: James P. Shepherd, Springfield; Linda C. Sawyer, Chatham, both of N.J.; Gerald Farrow, Charlotte, N.C.

[73] Assignee: Hoechst Celanese Corp., Somerville, N.J.

[21] Appl. No.: 35,831

[22] Filed: Mar. 23, 1993

[51] Int. Cl.⁶ .............................................. B29C 49/04
[52] U.S. Cl. ........................... 264/540; 528/173; 528/180; 528/190; 528/193; 528/194
[58] Field of Search ............... 264/540; 528/173, 180, 528/190, 193, 194; 524/604

[56] References Cited

U.S. PATENT DOCUMENTS

| | | | |
|---|---|---|---|
| 4,071,503 | 1/1978 | Thomas et al. | 264/540 |
| 4,101,601 | 7/1978 | Thomas | 525/438 |
| 4,599,395 | 7/1986 | Dicke et al. | 528/173 |
| 4,942,005 | 7/1990 | Pollock et al. | 264/540 |
| 5,227,456 | 7/1993 | Shepherd | 528/173 |

OTHER PUBLICATIONS

Blizard et al., Blow Molding of Thermotropic LCPs Intern. Polymer Processing IV 1989 pp. 172–178.

Primary Examiner—Catherine Timm
Attorney, Agent, or Firm—P. S. Kalyanaraman

[57] ABSTRACT

Disclosed is a process for blow molding articles from liquid crystal polymers containing ionic moieties in the backbone. The ionic moieties increase the melt viscosity of the polymers sufficiently high to blow mold articles therefrom. An illustrative liquid crystal polymer is made from 4-hydroxybenzoic acid, 6-hydroxy-2-naphthoic acid and sodium 5-sulfoisophthalate.

13 Claims, 2 Drawing Sheets

PROCESS FOR BLOW MOLDING ARTICLES FROM LIQUID CRYSTAL POLYMERS

CROSS REFERENCE TO RELATED APPLICATIONS

The subject matter of this application is related to that disclosed in patent applications Ser. No. 854,148, filed Mar. 20, 1992, Ser. No. 07/968,708, filed Oct. 30, 1992, 07/967,896, filed Oct. 28, 1992, and Ser. No. 07/979,102, filed Nov. 20, 1992.

FIELD OF INVENTION

This invention relates to blow molding objects from unfilled liquid crystal polymers containing the residue of a sulfonated ionic monomer unit in the polymer backbone.

BACKGROUND OF THE INVENTION

The art of blow molding objects from polymeric resins is known. Blow molding is a process for making hollow parts such as, for example, bottles and beverage containers from resins such as, for example, polyethylene terephthalate (PET), and is described in several literature articles. Some examples are *Kirk-Othmer Encyclopedia of Chemical Technology*, Third Ed., Vol. 18, 198, (1982); *Encyclopedia of Polymer Science and Engineering*, Second Ed., Vol. 2, Wiley-Interscience Pub., John Wiley & Sons, New York, 447 (1985); *Concise Encyclopedia of Polymer Science and Engineering*, J. I. Kroschwitz, ed., Wiley-Interscience Pub., 90 (1990); *Molding of Plastics*, N. M. Bikales ed., Wiley-Interscience Pub., 89 (1971); and *Handbook of Plastic Materials and Technology*, I. I. Rubin, ed., Wiley-Interscience Pub., 1063 (1990).

In a typical process for blow molding hollow articles from thermoplastic resins, a molten tube or cylinder ("parison") of resin is extruded from a die above an open mold. The parison hangs from the die on its own support, while the mold is closed around it, and the bottom of the parison is pinched together by the mold. Air or a similar gas under pressure is fed through the die into the parison, which expands to fill the mold, and the part is cooled as it is held under internal air pressure, and then released. The process requires that the resin exhibit sufficiently high melt strength, typically high melt viscosity, to stay in shape and retain integrity during the low shear conditions on the parison, but good flow during the high shear blowing process.

Generally, thermoplastic resins such as, for example, polyethylene (PET), are commonly used in blow molding hollow articles. Among engineering resins, few are suitable for this purpose, due to their generally low melt viscosity. Because of this low melt viscosity, the parison does not have adequate strength to support itself from the die. The problems encountered in the blow molding of engineering resins are discussed by J. M. Daly and K. F. Wissbrun, *Melt Rheology and its Role in Plastics Processing-Theory and Applications*, Van Nostrand Reinhold Pub., New York, 522-523 (1990).

A class of engineering resins that are of much interest in this regard is the liquid crystal polymers (LCPs). LCPs have enjoyed commercial success due to their excellent strength and high temperature stability. Several of them are commercially available such as, for example, the Vectra ® resin from Hoechst Celanese Corporation, Engineering Plastics Division, Chatham, N.J. LCPs also suffer from the same disadvantage of low melt viscosity for blow molding. Because of their high potential for specialty applications, there has been much interest in improving their melt viscosity to make them suitable for blow molding.

One method that has been tried in the past is to use external filler matter such as glass, fiber and the like, to increase the melt viscosity of LCPs. Pending application, Ser. No. 07/967,896, filed Oct. 28, 1992 discloses filled LCPs suitable for blow molding applications. While this approach helps to some extent, it limits the applications where such resins could be used. For example, blow molded articles from such filled resins may contain certain porosity in their walls that may make them unsuitable for applications such as gas containment. It would be preferable to blow mold such articles from unfilled, homogeneous LCP resins, if their melt viscosities can be sufficiently increased.

Yet another approach that has been tried is to heat treat LCPs suitably to increase their melt viscosity and melt strength. Pending application Ser. No. 07/979,102, filed Nov. 20, 1992, discloses such a process. Such an approach involves the extra step of heat treatment with attendant possible cost increases. It would be preferable if the LCP resin has a composition that makes it suitable for blow molding directly, without having to resort to additional steps, or added filler matter.

SUMMARY OF THE INVENTION

It has now been found that the melt viscosities of LCPs can be significantly increased to values sufficiently high to blow mold hollow articles therefrom with no need to heat treat the resin or to add filler matter. The present invention describes a process to blow mold hollow articles from such LCPs with increased melt viscosity. The increase in melt viscosity is achieved by including a small amount of a recurring ionic moiety in the backbone of the LCP composition. An example of such moiety useful in the present invention is the residue of a wholly aromatic monomer having a suitable ionic group pendant thereto such as, for example, those described in pending application Ser. No. 07/854,148 filed Mar. 20, 1992. Useful ionic moieties are of the formulae:

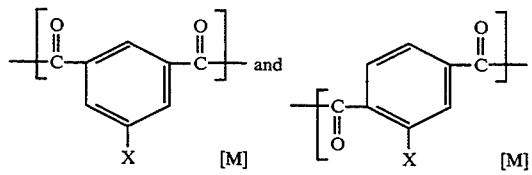

wherein X and M are a suitable combination of a cation and an anion. If M represents a cation M+, then X is an anion X−, and vice versa. Cation M+ may be selected from the group consisting of sodium, lithium, potassium, zinc, calcium, cadmium, magnesium, barium, quaternary ammonium, and mixtures thereof, while its corresponding X− anion may be, for example, sulfonate, sulfinate, phosphinate, phosphate, borate and the like. On the other hand, if X represents the cation X+, then X+ may be a quaternary ammonium, $NR_3^+$, wherein R may be the same or different $C_1$-$C_6$ groups, in which case its corresponding anion M− may be the above-described anionic groups.

The inventive process to make a hollow article thus comprises:

(a) providing an LCP comprising a recurring ionic moiety in its backbone such that the melt viscosity of the resin is suitable for blow molding;
(b) melting the above LCP in a suitable vessel to a temperature suitable to inject it;
(c) injecting the melted LCP into a suitable parison;
(d) bringing a mold in contact with the parison said mold being operative to define the desired shape of said hollow article; and
(e) blowing a gas into the parison to form the hollow article.

The inventive process advantageously uses unfilled homogeneous LCP resins for blow molding. Furthermore, since such resins possess melt viscosity sufficiently high to blow mold articles therefrom, there is generally no need for extra heat treatment.

While the present process is conceivably applicable to several types of LCP backbones, such as polyester-polyamides, polyesters and the like, containing the above-described ionic moieties, the types preferred for the invention are those that have the ionic moieties in the backbone of a wholly aromatic polyester LCP.

The present invention also discloses articles prepared by the above process.

BRIEF SUMMARY OF THE DRAWINGS

The invention is described in detail below with reference to FIGS. 1 and 2.

DESCRIPTION OF THE PREFERRED EMBODIMENTS

Figure 1:
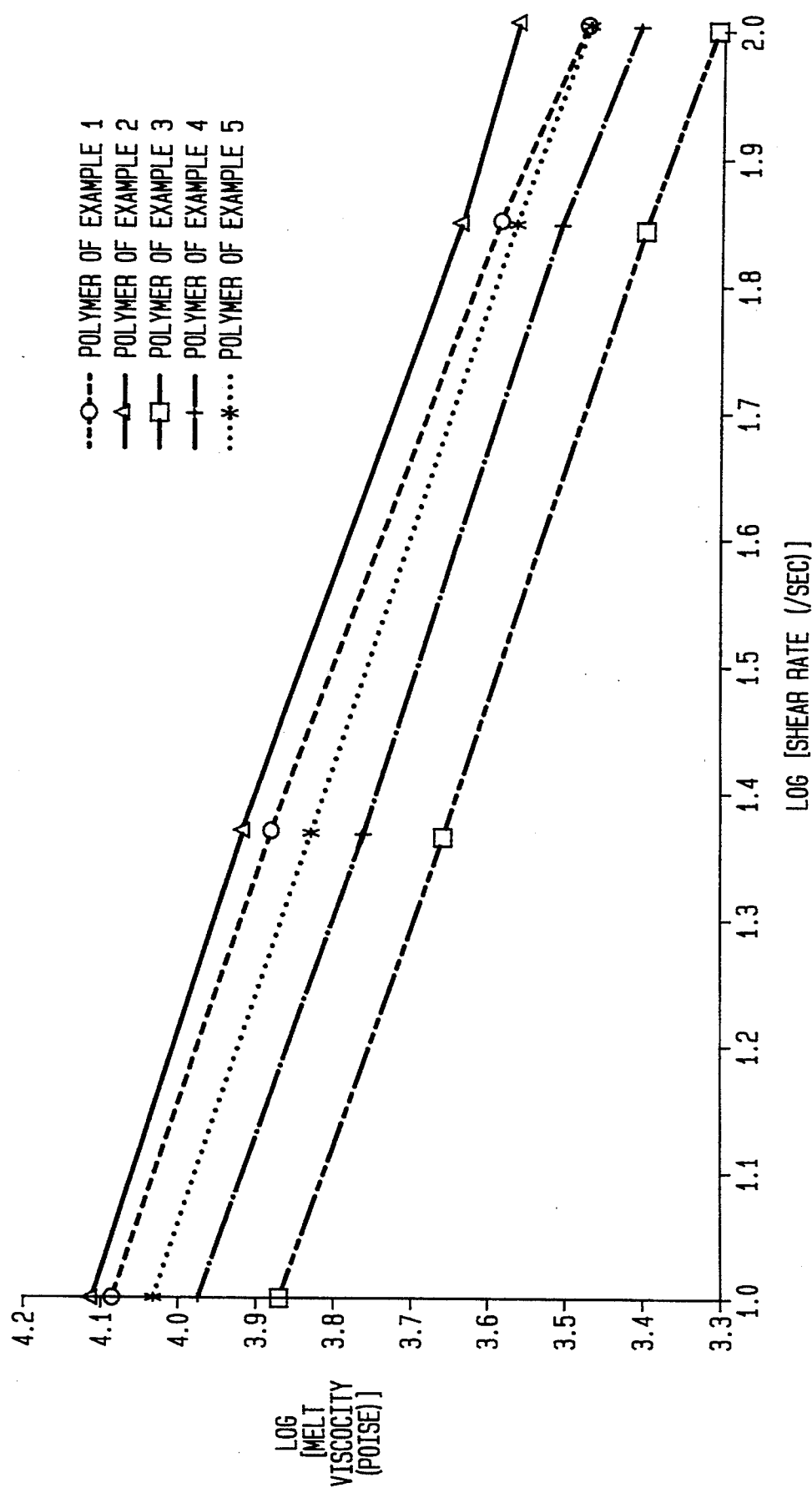
FIG. 1 is a plot of shear rate with melt viscosity of several LCPs.

In one embodiment, the present invention discloses a process for blow molding articles from an LCP. The LCP comprises a recurring ionic moiety in its backbone. The presence of the ionic moiety in the backbone significantly increases the melt viscosity of the polymer sufficiently high to mold hollow articles therefrom. The ionic moiety is present in the backbone of the LCP in amounts of 0.02–3 mole % generally, 0.05–2 mole % preferably and 0.05–1% typically. An example of such ionic moiety useful in the present invention is the residue of a wholly aromatic monomer having an ionic group pendant thereto. Useful ionic moieties are described above in the section entitled SUMMARY OF THE INVENTION. A preferred ionic moiety is the residue of a wholly aromatic monomer having a metallic sulfonate group pendant thereto such as, for example, a 5-sulfoisophthalate (Formula 1) or a 2-sulfoterephthalate (Formula 2) moiety.

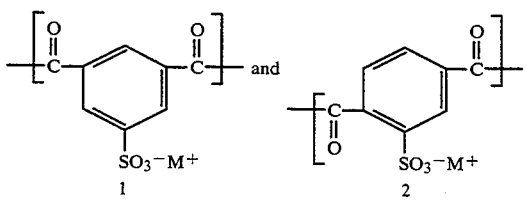

In Formulas 1 and 2, $M^+$ represents a cation, selected from the group consisting of sodium, lithium, potassium, zinc, calcium, cadmium, magnesium, barium, quaternary ammonium, and mixtures thereof. Copending Patent application Ser. No. 07/854,148 filed Mar. 20, 1992, discloses these and other ionic moieties useful for the practice of the present invention.

Preparation of LCPs containing such ionic moieties is described below as well as in copending Patent application Ser. No. 07/854,148 filed Mar. 20, 1992; specific details are given in the EXAMPLES section below. The following description details a general process to synthesize LCP ("CO-SSI") of 4-hydroxybenzoic acid ("HBA") with 6-hydroxy-2-naphthoic acid ("HNA") containing the ionic moiety 5-sulfoisophthalate unit in the backbone. The monomer for the ionic moiety is sodium 5-sulfoisophthalate ("SSI", available from Aldrich Chemical Company, Milwaukee, Wis.). Since the polymerization reaction is an esterification reaction, and since SSI itself can function as an esterification catalyst, no additional catalyst is generally needed.

The monomers may be used as such in the polymerization reaction. If desired, they may be dried for a short time in an oven, for example, for about 1–6 hours at about 100°–140° C. In a typical experiment, the polymerization reaction was performed in a suitable vessel generally under an inert atmosphere such as nitrogen. The monomers, e.g., HBA, HNA and sodium 5-sulfoisophthalate, were taken in the polymerization vessel, to which a reagent such as, e.g., acetic anhydride, was added, generally in excess (about 2–3 molar excess) molar amounts compared to the monomers. The reaction mixture was heated while purging the contents with nitrogen. The temperature profile of the heating was suitably designed to allow adequate time for acetylation of the monomers, followed by oligomerization, and then polymerization. During the later stage of the profile, the system was slowly evacuated while at the same time following the torque required to stir the mixture. The viscosity increased under vacuum during the final stages of polymerization. When the torque reached a predetermined level the vacuum was released by purging nitrogen into the reaction vessel. The polymer was allowed to cool, the solidified polymer then taken out and ground into pieces.

The melt viscosity of the polymer could be measured at various shear rates by standard techniques. In a typical measurement, the melt viscosity was determined on a capillary rheometer (Model No. 2052C by Kayeness Incorporated, Morgantown, Pa.) with a Hastelloy barrel and plunger tip. The die orifice was 0.04 inch in diameter and 0.8 inch in length. Apparent viscosities were measured at shear rates of 23.4 sec$^{-1}$, 70.3 sec$^{-1}$, 398 sec$^{-1}$, 1008 sec$^{-1}$ and 3516 sec$^{-1}$, and linear regression plots were used to derive interpolated viscosities at 100 sec$^{-1}$ and 1000 sec$^{-1}$. Such melt viscosities generally indicate melt strengths suitable for the formation of a sag resistant, stable parison during blow molding.

Three comparative polymers were prepared from HBA and HNA by following the procedure reported in U.S. Pat. No. 4,161,470. The comparative polymers did not contain the 5-sulfoisophthalate ionic moiety in the backbone. Two of those three comparative polymers had added glass fiber to them to increase their melt viscosities. Viscosity data was obtained as described above and similar linear regression plots were plotted. Correlation coefficients >0.99 were determined for each plot.

FIG. 1 shows a comparison of the melt viscosity of the polymers prepared according to the present invention (polymers of Examples 1 and 2) with that of a comparative polymer without the ionic moiety in its backbone (polymer of Example 3) and two other comparative polymers without the ionic moiety in their backbone but with glass fiber added (polymers of Examples 4–5). FIG. 1 shows the consistent high melt viscosity of the inventive polymers over a wide range of shear rates, thus demonstrating the superior melt viscosity of the polymers of the present invention suitable to result in sag-resistant, stable parisons during blow molding.

In accordance with the extrusion blow molding process of the present invention, the LCP may be heated to a molten state above its melting point suitable for extruding a well-formed parison, and may be maintained at this temperature until extrusion of parison has taken place. This temperature may be attained by the combination of heat provided to the extruder and shear-induced heat generated during the extrusion process. The compression ratio of the extruder screw affects the heat generated by shear, with a relatively higher compression ratio resulting in enhanced shear-induced heat.

As may be understood, a suitable extrusion temperature will be greater than the temperature at which polymer solidification would take place but less than the temperature at which polymer degradation would occur or at which the parison would be unstable and sag or stretch, resulting for instance, in a highly non-uniform wall thickness. It will be understood that each LCP will have its own operative temperature range for extrusion blow molding. Typically, by extruding the polymer at as low a temperature as possible, melt strength will be maximized.

When in accordance with the present invention, the molten polymer is extruded at an appropriate temperature, a well formed parison is produced. Extrusion may be intermittent or continuous. A shot of molten polymer is extruded through an annular gap, generally downward into space. Beneficially, intermittent extrusion periodically forms parisons after molten polymer is accumulated, and permits the extrusion of a large volume of molten plastic in a short period of time. Larger parts or structures may thus be produced.

Sag resistance and stability of a parison in a gravity hung, molten or near molten state are focal points of an extrusion blow molding process having broad applicability in accordance with the invention. Parison hang time will vary depending upon the parison size, the LCP selected, the die gap, and the rate of parison formation. Typically, compared to continuous extrusion blow molding, the hang time for intermittent extrusion blow molding may be significantly less in producing a part or structure of equal size. In making larger parts and structures, the LCP will be extruded at a temperature that appropriately provides sag resistance for an increased polymer mass.

At an appropriate time, typically after the parison has fallen to a selected length, a forming mold is clamped around the parison. The mold is typically clamped around a center portion of the parison, and the clamped parison remains connected to the extruder. A fluid such as air, which may be preheated or cooled, is then blown into the clamped parison to form a molded part or structure. After a suitable mold hold time, the mold is opened and the formed part or structure is removed.

A typical process for blow molding articles in accordance with the present invention could be demonstrated by molding hollow test plaques of size about $5 \times 11 \times \frac{1}{2}$ inches. A HYCON blow molding machine (Model No. MHC 10-1.5, manufactured by Hycon, Merrimack, N.H.) was used for the molding experiments. Polymers described in the EXAMPLES section were used in the molding experiments. Injection molding may be done generally at temperatures between about 260° C. and about 300° C., preferably about 275°–280° C. Comparative polymer of Example 3 (unfilled LCP without the ionic moiety) could not be blow molded due to insufficient melt strength (and melt viscosity) of the parison. The glass filled comparative polymers could be molded satisfactorily into hollow articles; more interestingly, the polymers of the present invention, even in their unfilled state and without additional heat treating, could be molded equally well, thus demonstrating their superiority.

Another embodiment of the invention includes articles made by the process of the present invention. The molded article may be used as it is for intended applications, or it may be laminated to suitable substrate materials by techniques described in pending patent application Ser. No. 07/854,148, filed Mar. 20, 1992. Substrate materials suitable for lamination include glass, metal, ceramic, or polymeric materials.

EXAMPLES

Example 1, Synthesis of a liquid crystal molyester containing 0.1 mole % of 5-sulfoisophthalate monomer residues: HBA (4.38 m), HNA (1.62 m) and sodium 5-sulfoisophthalte (0.006 m, 0.1 mole based on total moles of HBA and HNA monomers) were charged into a 2 liter three-necked flask, equipped with a Vigreaux column and condenser, nitrogen inlet, thermocouple and a stirrer (stainless steel "C"). The apparatus was de-aerated with three vacuum-nitrogen purge cycles and then acetic anhydride (2.5% molar excess) was added. The flask was then heated in a fluidized sand bath while purging with nitrogen. It was heated to about 125° C. over 50 minutes, to 140° C. over about 40 minutes, 150° C. over 20 minutes, 200° C. over 45 minutes, 210° over 5 minutes, 220° C. over 6 minutes, 275° C. over 50 minutes, 310° C. over 70 minutes, 325° C. over 25 minutes, 350° C. over 15 minutes, and 355° C. over 15 minutes. The system was slowly evacuated (100 mbar increments). The reading of the torque indicator was noted at the beginning of this vacuum period. The reading on the torque indicated that the viscosity of the polymer increased under vacuum at 355° C. When the increase in torque reached a predetermined level ($\Delta$torque=55 mv), the vacuum was released by purging nitrogen into the system. The apparatus was taken down and the polymer was allowed to cool. The polymer plug was removed by breaking the flask. The plug was cut into pieces and then ground into small particles. The polymer had an IV of 6.8 dl/g (measured in 1:1 HFIP-PFP) and a melting temperature of 270.5° C. (by DSC). Melt viscosity (see FIG. 1) at 300° C. and at a shear rate of 100 sec$^{-1}$ was 3089. This polymer could be blow molded at 275° C. as illustrated in Example 6 below.

Example 2, Synthesis of a liquid crystal polyester containing 0.2 mole % of 5-sulfoisophthalate monomer residues: By following a procedure described in Example 1, this polymer was prepared from HBA (4.37 m), HNA (1.62 m) and sodium 5-sulfoisophthalate (0.012 m, 0.2 mole %). The polymer had a melt temperature of 270° C. and a melt viscosity (see FIG. 1) of 3783 poise at 300° C. and at a shear rate of 100 sec$^{-1}$. This polymer was blow molded at 275° C. as illustrated in Example 6 below.

Example 3. Synthesis of unfilled comparative LCP: A polymer containing 73 mole % HBA and 27 mole % HNA was prepared as described in U.S. Pat. No. 4,161,470. It had a melt temperature of 280° C. and a melt viscosity of 2030 poise at 300° C. and at a shear rate of 100 sec$^{-1}$. This polymer could not be blow molded.

Example 4. Comparative polymer with 15 wt % glass fibers: A blend of 85 wt % of the polymer from Example 3 and 15 wt % glass fibers (Model OCF491AA from Owens-Corning FiberGlas Corporation, Anderson, S.C.) was prepared in a commercial extruder (Model no. ZSK28, from Werner and Pfleiderer Corporation, Ramsey, N.J.) as described in U.S. Pat. No. 4,61,470. It had a melt temperature of 280° C. and a melt viscosity of 2607 poise at 300° C. and at a shear rate of 100 sec$^{-1}$.

Example 5. Comparative polymer with 30 wt % glass fibers: A blend of 70 wt of the polymer from Example 3 and 30 wt % glass fibers was prepared as in Example 4. It had a melt temperature of 280° C. and a melt viscosity of 3041 poise at 300° C. and at a shear rate of 100 sec$^{-1}$.

Figure 2:
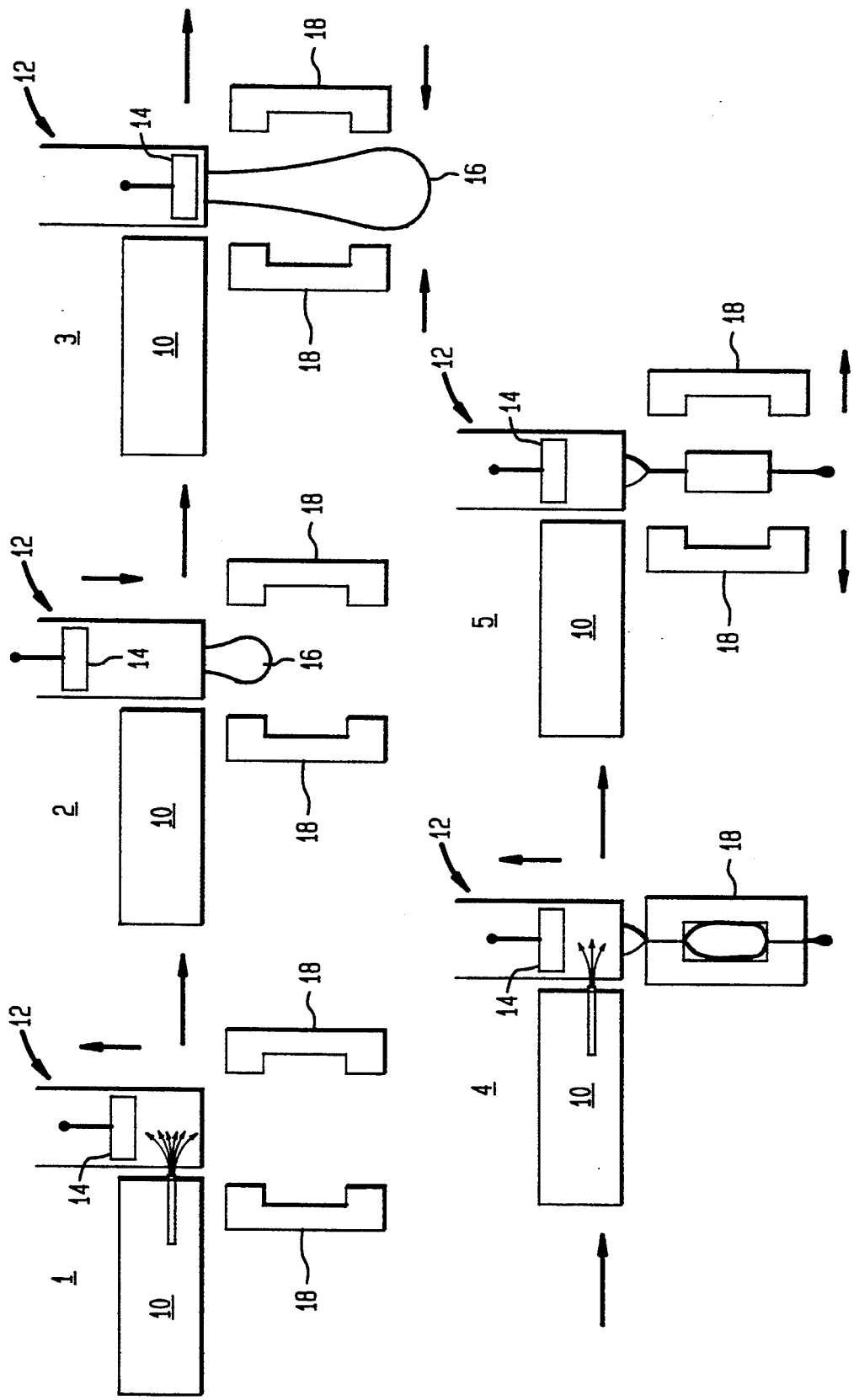
FIG. 2 schematically illustrates one approach for carrying out the blow molding process of the present invention.

Example 6. General procedure for blow Molding test parts: The LCP samples were dried in a vacuum oven at about 125° C. for about 20 hours before use. With reference to FIG. 2, a HYCON extruder (10) was cleaned (Step 1) and then fed with the LCP which was then melted (melt temperature: about 275°-280° C.). Operating parameters were as follows: tooling, 3.5" diameter divergent style; screw compression ratio, 2.25:1; screw speed, about 75 rpm; temperature settings: extruder feed portion: 243° C.; feed, 240° C.; die, 240° C.; mold, 121° C. The melt was between 275° C. and 280° C.

Molten polymer accumulates within the head 12 and a parison 16 (about 1–1.5 lbs) is formed from a shot of polymer melt extruded through the annular gap vertically downward into space, by means of a ram 14 (step 2). A mold 18 in the form of a 5"×11" plaque with fine texture and at about 120° C., is clamped around a center portion of the parison after the parison has fallen to a desired length (step 3). Nitrogen (120 psig) is blown in (step 4). After about one minute under pressure, the nitrogen is expelled, the mold is opened and the formed part is removed (step 5). The formed part or panel is a hollow plaque with the following dimensions: 5"×11"×½" with a wall thickness of approximately 0.075". The panel weighs about 0.5 lb.

The process is repeated by forming a parison from another shot of the polymer melt, clamping the mold around the parison, blowing, and so forth. The panels are found to be to specification.

What is claimed is:

1. A process to make hollow articles from a wholly aromatic liquid crystal polymer, comprising:
    (a) providing a wholly aromatic liquid crystal polymer comprising, in its backbone, in the range of about 0.05–2 mole %, a recurring ionic moiety;
    (b) melting said liquid crystal polymer of step (a) in a vessel suitable to extrude it;
    (c) extruding the melted polymer into a parison;
    (d) bringing a mold in contact with said parison, said mold being operative to define the desired shape of said hollow article; and
    (e) blowing a gas into said parison to form the hollow article, wherein said ionic moiety is selected from the formulae:

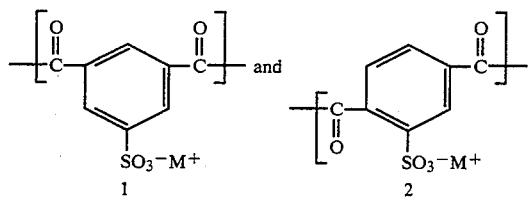

wherein M+ is a cation selected from the group consisting of sodium, lithium, potassium, zinc, calcium, cadmium, magnesium, barium, quaternary ammonium $NR_3$-, and mixtures thereof, with R being the same or different $C_1$-$C_6$ groups.

2. The process as described in claim 1, wherein said liquid crystal polymer is a wholly aromatic polyester containing said ionic moiety in its backbone.

3. The process as described in claim 2, wherein said wholly aromatic polyester containing said ionic moiety in its backbone is a polyester comprising residues of 4-hydroxybenzoic acid and 6-hydroxy-2-naphthoic acid.

4. The process as described in claim 1, wherein said liquid crystal polymer is a wholly aromatic polyester-polyamide containing said ionic moiety in its backbone.

5. The process as described in claim 1, wherein X is a cationic group and M is an anionic group.

6. The process as described in claim 1, wherein X is an anionic group and M is a cationic group.

7. The process as described in claim 1, wherein X is a sulfonate and M is sodium.

8. The process of claim 1, wherein M+ is sodium ion.

9. The process of claim 1, wherein said ionic moiety is present in the liquid crystal polymer in concentrations of about 1.0 mole percent.

10. The process as described in claim 1, wherein said melted polymer has melt viscosity in the range 2400–8000 poise, measured at a shear rate of 100 sec$^{-1}$ at 3000° C.

11. The process as described in claim 1, wherein said extrusion of melted polymer in step (c) is performed in the temperature range 260°-300° C.

12. The process as described in claim 1, wherein said extrusion of melted polymer in step (c) is intermittent.

13. The process as described in claim 1, wherein said extrusion of melted polymer in step (c) is continuous.

* * * * *